（12) United States Patent
Norton

(10) Patent No.: US 6,454,973 B1
(45) Date of Patent: Sep. 24, 2002

(54) MULTIPLE INJECTION OF A SINGLE INJECTION MOLDING VALVE GATE

(75) Inventor: Dennis J. Norton, Spencerport, NY (US)

(73) Assignee: Xerox Corporation, Stamford, CT (US)

( * ) Notice: Subject to any disclaimer, the term of this patent is extended or adjusted under 35 U.S.C. 154(b) by 110 days.

(21) Appl. No.: 09/626,344

(22) Filed: Jul. 26, 2000

Related U.S. Application Data

(62) Division of application No. 09/162,750, filed on Sep. 29, 1998, now Pat. No. 6,144,117.

(51) Int. Cl.[7] .............................................. B29C 45/23
(52) U.S. Cl. ..................... 264/40.1; 264/328.1; 425/145
(58) Field of Search .............................. 264/40.1, 40.5, 264/328.1, 328.8; 425/145, 146, 147, 568, 162, 159; 307/141, 141.4, 125; 700/200

(56) References Cited

U.S. PATENT DOCUMENTS

| | | | |
|---|---|---|---|
| 3,695,800 A | * 10/1972 | Hutchinson et al. ....... | 264/40.6 |
| 3,884,608 A | * 5/1975 | King .......................... | 425/145 |
| 3,902,665 A | 9/1975 | Hendry ....................... | 239/119 |
| 4,140,238 A | 2/1979 | Dawson ...................... | 222/495 |
| 4,279,582 A | 7/1981 | Osuna-Diaz ................ | 425/159 |
| 4,592,711 A | 6/1986 | Capy ........................... | 425/144 |
| 4,851,170 A | 7/1989 | Shimizu et al. ............ | 264/40.5 |
| 5,078,589 A | 1/1992 | Osuna-Diaz ................ | 425/562 |
| 5,141,696 A | 8/1992 | Osuna-Diaz ............. | 264/297.2 |
| 5,149,547 A | 9/1992 | Gill ............................. | 425/145 |
| 5,523,045 A | 6/1996 | Kudert et al. ............... | 264/513 |
| 5,556,582 A | * 9/1996 | Kazmer ...................... | 264/40.1 |
| 5,645,866 A | * 7/1997 | Eckardt et al. ............. | 425/145 |
| 6,227,840 B1 | * 5/2001 | Keller et al. ................ | 425/147 |

OTHER PUBLICATIONS

"Control Cavity Filling with Melt 'Throttles' in the Mold"; Plastic Technology Magazine; Jun., 1998.
Internet Printout, Incoe Corporation, Jul. 5, 1998.

* cited by examiner

Primary Examiner—Jill L. Heitbrink
(74) Attorney, Agent, or Firm—Andrew D. Ryan

(57) ABSTRACT

An apparatus for sending a plurality of switching signals to a switching device for sequentially switching the position of an injection gate of a injection molding machine is provided. The apparatus is utilized for molding a work piece in a mold during a molding cycle from a first closed position, to a first open position, to second closed position, to a second open position and then to a third closed position. The switching signals are indicative of one of the open position and the closed position. The apparatus is to be hand carried by a machine operator. The apparatus includes a body. The body is hand carriable by a machine operator. The apparatus also includes a first input conduit and a second input conduit. The first input conduit is operably associated with the body for receiving a first switching signal indicative of a desire to switch the position of the injection gate. The second input conduit is operably associated with the body for receiving a second switching signal indicative of a desire to switch the position of the injection gate. The apparatus also includes an output conduit simultaneously operably connected to the first input conduit and to the second input conduit for transmitting one of the first switching signal. The apparatus also includes a first inhibitor and a second inhibitor. The first inhibitor is operably associated with the second input conduit for inhibiting the first switching signal from being transmitted through the second input conduit. The second inhibitor is operably associated with the first input conduit for inhibiting the second switching signal from being transmitted through the first input conduit.

8 Claims, 8 Drawing Sheets

MULTIPLE INJECTION OF A SINGLE INJECTION MOLDING VALVE GATE

This application is a divisional of application(s) No(s). 09/162,750, filed Sep. 29, 1998 now U.S. Pat. No. 6,144, 117.

This invention relates generally to molding an article with material, and more particularly concerns an injection control gate for controlling the flow of moldable material into a mold for molding an article.

Cross reference is made to the following application filed concurrently herewith: U.S. application No. (D/98408), entitled "Portable Injection Gate Control for Plastic Molding", by Dennis J. Norton.

The use of plastic components in machines, equipment and generally in commercial products is wide, extensive and continually growing. Plastic components afford low cost, lightweight corrosion resistance and many other significant advantages.

The manufacture of plastic components is typically accomplished through a molding process. The molding process includes injecting plastic material in the form of small pellets into a machine which includes a mold having a cavity with the shape of the plastic component. The plastic pellets are conveyed into a cavity or chamber and are advanced toward the cavity of the mold by a screw or ram. The screw or ram is housed in an electrically heated enclosure which melts the. pellets into a liquid which readily fills the cavity within the mold.

The mold typically includes a fixed and movable portion with the cavity being formed therebetween. The movable portion of the cavity is separated from the fixed portion after the cavity. is filled with the plastic fluid and allowed to cool. The cooled plastic material thus forms the molded plastic part.

The plastic liquid within the screw or ram is introduced into the mold cavity through channels or runners in communication between the screw of ram and the mold cavity. To regulate the flow of the plastic material through the channels or runners, valves typically called gates are positioned within the channels or runners and are opened to permit flow of the plastic fluid therethrough and closed to prohibit the flow of the fluid.

The opening and closing of the gates within the channels or runners is an important part of the development of a proper process for molding plastic parts. This is particularly true for large and flat complex components which may have a large number of channels or runners and consequently a plurality of gates.

Typical problems in the filling of the plastic fluid within the mold cavity are fill balancing and clamp tonnage optimization. In fill balancing, it may be necessary to have more fluid pass through a channel in a area within is the mold cavity which has a large area or mass and to permit only a much smaller amount of plastic fluid to flow through a channel related to a portion of the mold cavity where the mass or cross section is quite small.

Further, in order to optimize, i.e. minimize, the clamp tonnage which is the pressure or force required to clamp the mold or cavity halves together against injection pressure. Clamp tonnage is best minimized when the flow of the plastic material through the channels or runners corresponding to portions of the cavity are evenly balanced and much higher amounts of material are not necessary to be filled within only one particular gate which corresponds to that area of high volume. Thus optimum flow of material through the proper channels or runners for the proper period of time may minimize the amount of injection pressure or force required to fill the mold cavity with liquid plastic, and thus reduce clamp tonnage requirements.

Furthermore, as the liquid plastic enters the mold cavity from different channels or runners, the molded material meets at a transition zone within the cavity. The integrity and appearance of the plastic material at this transition zone may be inferior to other portions of the plastic material within the mold cavity. For example, the transition zones may occur at highly visible areas where the appearance of the molded article is more important or in areas of greater stress within the molded article where material integrity is more critical. Thus, it is important that the flow of material into the mold be accurately and precisely controlled.

While generally it may be sufficient to open and close a gate within a channel or runner only once during the molding cycle, at times it may be desirable to open and close different gates at different times within the molding cycle, or a particular gate more than once. In situations where material is passed through a first channel with a first gate into an area of small cross section while additional material is permitted to flow through a second channel and a second gate into a area of large cross section, the area of greater cross section typically requires a much large amount of time to fill the large cavity. Thus, the first channel with the small cavity area has its gate shut before the second gate of the large area is shut.

The material flowing through the first channel then tends to cool after it has flowed and may cause a problem since the gate, which is now shut cannot transmit hold, or pack pressure to the minor area. The material in this area will shrink away from the cavity wall during the hold phase of the molding cycle if hold pressure cannot be applied. This will render the molded article unusable dimensionally and cosmetically. If, however, the first gate which regulates the first channel is permitted to be opened again for a short period of time immediately preceding the end of the molding cycle, pressure through the first channel may cause the molded material through the first channel to transmit hold pressure through the molded article and avoid an unacceptable article.

Typically, molding machines either have no capability whatsoever to regulate gates within a mold of the plastic molding machine, or include only the ability of opening all the gates and closing all the gates simultaneously. Other newer machines may have some limited ability to sequence gates but may be limited to a time variable singular sequence for each injection gate within the molding cycle.

Newer, modern, more expensive machines such as those manufactured by Engel Manufacturing Company, Guelph, Canada, Model No. 600/200 VHRO, have the ability to sequence the opening and closing of gates within a molding machine. These machines are able to open and close a particular gate once during the molding cycle. Recently, Incoe Corporation has offered a gate sequencing control system for opening and closing the valves of a mold for a molding machine. The Incoe system is portable computer based system and is very complicated and expensive.

The following disclosures may be relevant to various aspects of the present invention:

U.S. Pat. No. 5,523,045

Patentee: Kudert et al.

Issue Date: Jun 4, 1996

U.S. Pat. No. 5,149,547

Patentee: Gill

Issue Date: Sep. 22, 1992

U.S. Pat. No. 5,141,696

Patentee: Osuna-Diaz

Issue Date: Aug. 25, 1992

U.S. Pat. No. 5,078,589

Patentee: Osuna-Diaz

Issue Date: Jan. 7, 1992

U.S. Pat. No. 4,592,711

Patentee: Capy

Issue Date: Jun. 3, 1986

U.S. Pat. No. 4,279,582

Patentee: Osuna-Diaz et al.

Issue Date: Jul. 21, 1981

U.S. Pat. No. 4,140,238

Patentee: Dawson et al.

Issue Date: Feb. 20, 1979

U.S. Pat. No. 3,902,665

Patentee: Hendry

Issue Date: Sep. 2, 1975

Control Cavity Filling with Melt 'Throttles' in the Mold

Plastic Technology Magazine

June 1998

Internet printout

Incoe Corporation

Jul. 5, 1998

The relevant portions of the foregoing disclosures may be briefly summarized as follows:

U.S. Pat. No. 5,523,045 discloses methods for injection molding and injection blow-molding multi-layer plastic articles, including containers and partisans for forming containers, which include providing a plurality of co-injection nozzle means for injecting plastic materials into associated injection cavities to form each article, providing streams of polymeric materials to form corresponding layers of the articles, moving each stream separately to plural nozzle means, separately receiving the streams in the plural nozzle means, and injecting the streams to form the multi-layer plastic articles. Preferably, each stream of material which is to form a corresponding layer of the articles is provided with substantially the same polymer flow, preferably from where each stream is split and moved to each nozzle means. Valve means can be employed in each nozzle means for positively controlling preferably substantially simultaneously the flow and nonflow of respective materials into the central channel of the nozzle means. Preferably, injection is effected to provide uniform onset flow of one or more internal layer materials into the central channel, cause foldover of one or more of the internal layers and provide in the parison or container sidewall one or more internal layers whose leading edge is substantially unbiased relative to the terminal end of the sidewall.

U.S. Pat. No. 5,149,547 discloses apparatus and methods suitable for controlling and metering thermoplastic material or resin to multiple cavities of dissimilar volume, such as a family mold is described, whereby the amount of resin injected into each cavity can be individually controlled. This system minimize overfilling or underfilling of individual article cavities in such a multiple cavity tool and, therefore, allows for the production of more uniform plastic articles from a multiple cavity mold or tool. In practice, a spindle, which designed to rotate in a reproducible manner as resin flows past it, is inserted into the resin stream feeding each cavity. The amount of resin fed to a particular cavity is determined by measuring the rotation of the spindle. When the amount of resin fed to a particular cavity is equal to the amount appropriate for that cavity (the target amount), the shut-off valve associated with that cavity is activated, thereby terminating the resin flow to that cavity without affecting resin flow to the other cavities. Resin flow is continued until all cavities are filled with their respective target amounts of resin. The apparatus and methods of this invention are especially adapted for use in gas-assisted injection molding using multi-cavity equipment.

U.S. Pat. No. 5,141,696 discloses an engagement for mechanically adjusting the flow through each of a plurality of mold nozzles supplied by a manifold for a multi-cavity mold, to properly balance the flow into each mold cavity. The arrangement includes a converging opening located immediately upstream of the cavity gate opening and receiving a pin extending through the main feed passage. The position of the pin is axially adjustable by having a threaded head received in a threaded bore formed in the manifold, with a pressure sealing bushing received over the pin stem. The flow of material can be balanced by externally adjusting the position of the pin associated with each mold nozzle. A side accessible arrangement is provided in a second embodiment, in which a worm gear drive connects a transversely arranged cross rod to the adjustment pin.

U.S. Pat. No. 5,078,589 discloses an arrangement is disclosed for independently controlling shutoff and flow to a cavity gate in a. multi-cavity injection mold apparatus, in which a plurality of valve pins are mounted to a movable holder plate, each aligned with a cavity gate and movable thereinto to control shutoff and a plurality of fixed position plunger sleeves are each mounted over a respective valve pin and adjustably positioned with respect to a restriction feature in the supply passage upstream of the associated gate.

U.S. Pat. No. 4,592,711 discloses an apparatus for injection molding plastic parts. The method includes the step of melting and pressurizing plastic material, directing the molten pressurized plastic material into passages leading to a mold, a selectively opening shut-off valve disposed along the passages, selectively closing the shut-off valve after a predetermined amount of molten pressurized plastic material has entered the mold and cooling the predetermined amount of molten pressurized plastic material in the mold to form a part. The apparatus includes an extruder providing pressurized molten plastic material, a mold adjacent the extruder, passages interconnecting the extruder with the mold, and a selectively operable shut-off valve disposed along the passage.

U.S. Pat. No. 4,279,582 discloses a method and apparatus for multiple cavity injection molding which permits individual variation of gate opening time for mold shut-off bushings. The gate pins for the shut-off bushings are controlled by individual double-acting fluid motor, the bushings being fed by a common manifold. Gate opening is thus not dependent upon attainment of a predetermined injection pressure. Closure of the gate for each cavity will permit material to be fed faster to the other cavities. Novel means is provided for securing each gate pin to its actuating cylinder, which minimizes heat transfer to the motor, accommodates expansion of the material manifold and permits gate opening adjustment. The fluid motors are end-mounted on an actuating fluid manifold, allowing close juxtaposition. A cycle counter may be used to control inventory.

U.S. Pat. No. 4,140,238 discloses a nozzle shut-off valve for injection molding machine for plastic material, especially thermoplastic material, has two pneumatic cylinder-and-plunger units. One such unit has its plunger mounted to reciprocate so as to block the passageway of the plastics through the nozzle. The first such plunger and cylinder unit is provided with a pilot passage in the valve nozzle so that the pressure of molten plastic can be used to open it. The second such unit is much smaller diameter and has its plunger mounted to block the pilot passage so that the second unit in effect becomes a pilot valve and controls the application of fluid pressure through the pilot passage to the first unit plunger or blocking plunger.

U.S. Pat. No. 3,902,665 discloses an extruder shut-off nozzle with a valve body and orifice having a plurality of metering ports feeding the nozzle passageway. A closure member captive in the body of the torpedo capable of being moved by compressed air after an injection cycle to seal the extruder orifice and prevent drooling of plasticized material at the nozzle when starting the next mold cycle. A suck-back action of the extruder screw at completion of the injection cycle will cause melt normally in the nozzle to be pulled back into the extruder chamber, thereby preventing drooling of plastic from the nozzle when the piston is in the shut-off position.

"Control Cavity Filling with Melt 'Throttles' in the Mold" discloses a dynamic feed system for an injection molding machine. By adjusting an array of melt-flow throttle valves, closed loop pressure control is in the tool, rather than in the machine.

Incoe Corporation internet listing discloses a gate sequencing Control system for controlling the opening and closing of pneumatic or hydraulic valve gates and provides up to 40 gate sequences. The activation of the gates may be based on screw position, time or a combination and gates may be reopened if desired.

All of the above references are hereby incorporated by reference.

SUMMARY OF THE INVENTION

In accordance with one aspect of the present invention, there is provided an apparatus for sending a plurality of switching signals to a switching device for sequentially switching the position of an injection gate of a injection molding machine is provided. The apparatus is utilized for molding a work piece in a mold during a molding cycle from a first closed position, to a first open position, to second closed position, to a second open position and then to a third closed position. The switching signals are indicative of one of the open position and the closed position. The apparatus is to be hand carried by a machine operator. The apparatus includes a body. The body is hand carriable by a machine operator. The apparatus also includes a first input conduit and a second input conduit. The first input conduit is operably associated with the body for receiving a first switching signal indicative of a desire to switch the position of the injection gate. The second input conduit is operably associated with the body for receiving a second switching signal indicative of a desire to switch the position of the injection gate. The apparatus also includes an output conduit simultaneously operably connected to the first input conduit and to the second input conduit for transmitting one of the first switching signal. The apparatus also includes a first inhibitor and a second inhibitor. The first inhibitor is operably. associated with the second input conduit for inhibiting the first switching signal from being transmitted through the second input conduit. The second inhibitor is operably associated with the first input conduit for inhibiting the second switching signal from being transmitted through the first input conduit.

Pursuant to another aspect of the present invention, there is provided a method for sending a series of switching signals to a switching device for sequentially switching the position of an injection gate of a injection molding machine. The method is used for molding a work piece in a mold during a molding cycle from a first closed position, to a first open position, to second closed position, to a second open position and then to a third closed position. The switching signals are indicative of the open position. The switching device is to be hand carried by a machine operator. The method includes the steps of providing a hand carriable portable control unit for sending a series of switching signals to a switching device for sequentially switching the position of an injection gate, receiving at a first input conduit of the portable control unit a first switching signal indicative of a desire to switch the position of the injection gate from the first closed position to the first open position, inhibiting the transmission of the first switching signal to a second input conduit of the portable control unit, transmitting the first switching signal through the portable control unit to the injection gate, switching the position of the injection gate from the first closed position to the first open position, detecting the absence of the first switching signal, the absence being indicative of a desire to switch the position of the injection gate from the first open position to the second closed position, transmitting the absence of first switching signal through the portable control unit to the injection gate, switching the position of the injection gate from first open position to the second closed position, receiving at the second input conduit of the portable control unit a second switching signal indicative of a desire to switch the position of the injection gate from the second closed position to the second open position, inhibiting the transmission of the second switching signal to the first input conduit of the portable control unit, transmitting the second switching signal through the portable control unit to the injection gate, switching the position of the injection gate. from the second closed position to the second open position, detecting the absence of the second switching signal, the absence being indicative of a desire to switch the position of the injection gate from the second open position to the third closed position, transmitting the absence of the second switching signal through the portable control unit to the injection gate, and switching the position of the injection gate from second open position to the third closed position.

Pursuant to yet another aspect of the present invention, there is provided an article made by a injection molding process including sending a series of switching signals to a switching device for sequentially switching the position of an injection gate of a injection molding machine. The process is utilized for molding a work piece in a mold during a molding cycle from a first closed position, to a first open position, to second closed position, to a second open position and then to a third closed position. The switching signals are indicative of the open position. The switching device is to be hand carried by a machine operator. The process includes the steps of providing a hand carriable portable control unit for sending a series of switching signals to a switching device for sequentially switching the position of an injection gate, receiving at a first input conduit of the portable control unit a first switching signal indicative of a desire to switch the position of the injection gate from the first closed position to the first open position, inhibiting the transmission of the first switching signal to a second input conduit of the portable control unit, transmitting the first switching signal through the portable control unit to the injection gate, switching the position of the injection gate from the first closed position to the first open position, detecting the absence of the first switching signal, the absence being indicative of a desire to switch the position of the injection gate from the first open position to the second closed position, transmitting the absence of the second switching signal through the portable control unit to the injection gate, switching the position of the injection gate from first open position to the second closed position, receiving at the second input conduit of the portable control unit a second switching signal indicative of a desire to switch the position of the injection gate from the second closed position to the second open position, inhibiting the transmission of the second switching signal to the first input conduit of the portable control unit, transmitting the second switching signal through the portable control unit to the injection gate, switching the position of the injection gate from the second closed position to the second open position, detecting the absence of the second switching signal, the absence being indicative of a desire to switch the position of the injection gate from the second open position to the third closed position, transmitting the absence of first switching signal through the portable control unit to the injection gate, and switching the position of the injection gate from second open position to the third closed position.

IN THE DRAWINGS

Other features of the present invention will become apparent as the following description proceeds and upon reference to the drawings, in which.

DETAILED DESCRIPTION

Figure 4:
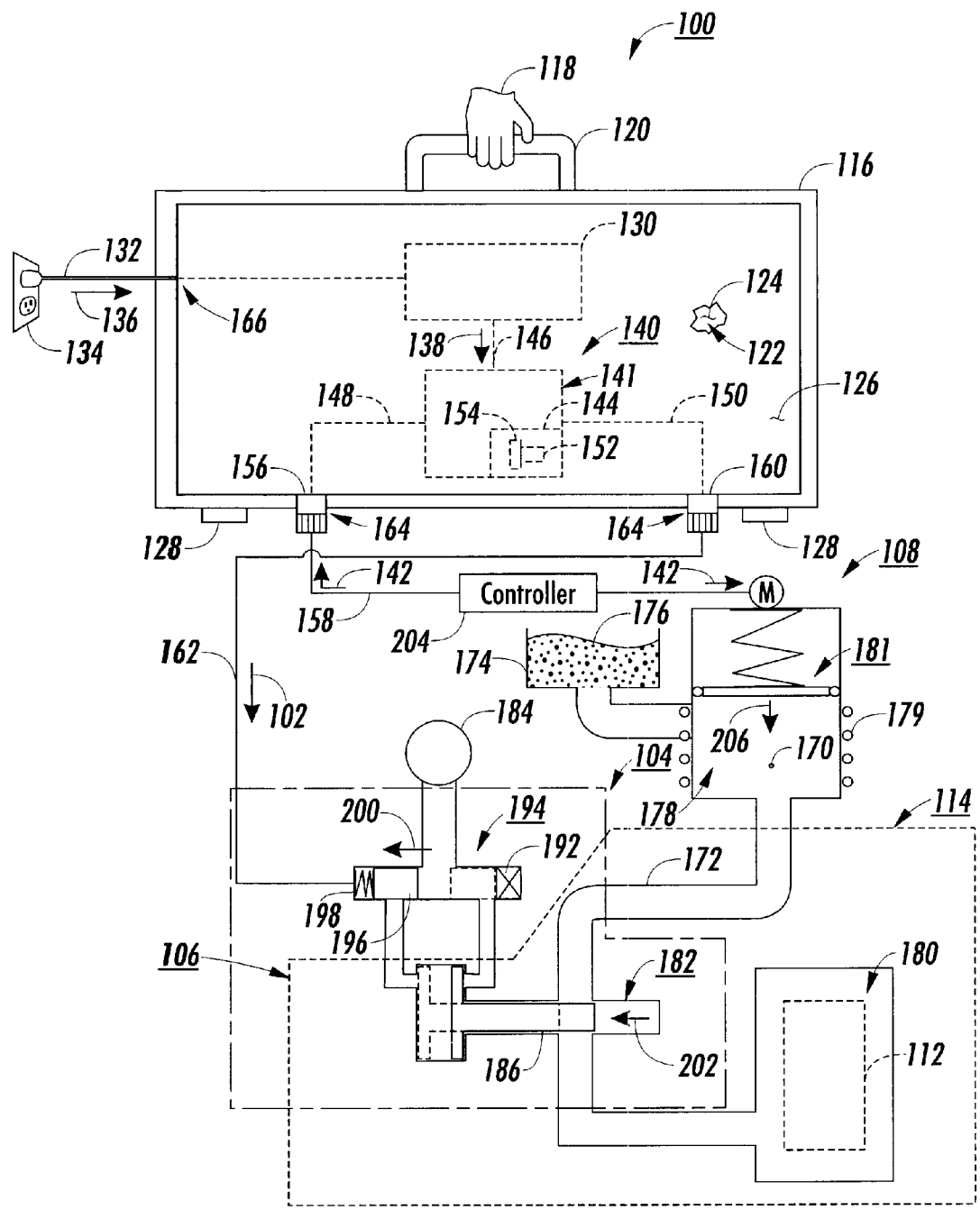
FIG. 4 is a schematic view of a second embodiment of a portable injection gate control for plastic molding.

Referring now to FIG. 4, a portable molding gate control apparatus 100 is shown. The portable gate apparatus 100 is utilized for sending a switching signal 102 to a switching device 104 for switching the position of an injection gate 106 of an injection molding machine 108. The molding machine 108 is utilized for molding a workpiece 112 in a mold 114 during a molding cycle between an open and closed position. The switching signal 102 is indicative of either the open position or the closed position. The apparatus 100 is adapted to be hand carried by a machine operator 118.

The portable molding gate control apparatus 100 includes a frame 116. The frame 116 may have any suitable shape and configuration and includes a portion 120 thereof for gripping by the operator 118. For example, the frame 116 may be in the form of a container. The container 116 defines a cavity 122 therein. The container 116 may include a bottom 124 and a top 126. While the top 126 and the bottom 124 may be connected in any suitable manner to form the container 116, preferably, the top 126 is pivotally connected to the bottom 124. For example, hinges 128 may be secured to the bottom 124 and the top 126 of the container 116.

The apparatus 100 further includes a power supply 130. The power supply 130 is utilized to provide the power required for the switching signal 102. The power supply 130 may be any power supply capable of providing the switching signal 102. For example the power supply 130 may be in the form of a direct current (d.c.) power supply, i.e. in the form of a commercially available dry cell or liquid cell battery.

Preferably, however, the power supply 130 may include a power cord 132 which is attached to the power supply 130 and is used to interconnect the power supply 130 with a power source 134 in the form of an external power source. The external power source may be for example 110 volt a.c.

For example, where the power source 134 is the form of an alternating current (a.c.) power source, the power supply 130 preferably includes a transformer, rectifiers, filters, and regulators that transform alternating current 136 coming from the power source 134 into a direct current 138.

The power supply 130 may be any suitable commercially is available power supply capable of transforming the alternative current 136 into the direct current 138. For example, the power supply 130 may be a power supply available from POWER-ONE, Inc., 740 Calle Piano, Camarillo, Calif. 93012. For example, Model HC24-2.4-A available from POWER-ONE is capable of providing 2.4 amps at 24 volts as the d.c. output.

Commercially available injection molding machines 108, such as those available from Engel typically include control circuits for controlling the gates 106 within the mold 114 with a d.c. source at, for example 24 volts. Therefore, if the power supply 130 is equipped for operation at 24 volts, the operation at 24 volts is very compatible with typical injection molding machines 108, and is thus preferred.

The portable molding gate control apparatus 100 further includes a timer 140. The timer 140 is operably connected to the power supply 130. The timer 140 receives an initiation signal 142 from the injection molding machine 108. The initiation signal 142 is indicative of the initiation of the molding cycle. The timer 140 is utilized for generating the switching signal 102 in response to the initiation signal 142. The timer 140 may be any device capable of receiving the initiation signal 142 and sending the switching signal 102 at a later period of time. For example, the timer 140 may include a time delay relay 141.

The time delay relay 141 may include a timing device, i.e. an electrical timer 144. The timer 140 may also include a first electrical conduit 146. The first electrical conduit 146 is electrically connected to the time delay relay 141 for transmitting electrical power 138 from the power supply 130.

The timer 140 preferably also includes a second electrical conduit 148 for receiving the initiation signal 142 indicative of the initiation of the molding cycle from the molding machine 108. The second electrical conduit 148 is electrically connected to the time delay relay 141. The timer 140 further includes a third electrical conduit 150. The third electrical conduit 150 is electrically connected to the time delay relay 141. The third electrical conduit 150 is utilized to transmit the switching signal 102 from the timer 140 to the molding machine 108.

The timer 140 is thus utilized for receiving the initiation signal 142 indicative of the initiation of the molding cycle and delaying the transmitting of the switching signal 102 to the molding machine 108 until a time delay 152 set by the timing device 144 has expired. The timing device 144 of the timed delay relay 140 may include, for example, a manual adjustment 154 for setting the time delay 152.

The time delay relay 141 may be any device capable of receiving an initiation signal 142 and for transmitting at a later time a delay signal 102 in response to the initiation signal 142. For example, the time delay relay 141 may be in the form of part no. TRDU24A2 multi-mode time delay available from SSAC, P.O. Box 1000, Baldwinsville, N.Y. 13027. The SSAC time delay relay includes a number of manual adjustments (not shown) which may be set to provide a variety of delay times between the initiation signal and the switching signal as well as variable dwell of the switching signal once initiated.

The portable molding gate control apparatus 100 further includes an input conduit 156. The input conduit 156 is operably associated with the frame 116 and is utilized to transmit the initiation signal 142 to the timer 140. The input conduit 156 may be in the form of, for example, a pin type connector. Preferably, a cable 158 is operably connected to the input conduit 156 and transmits the initiation signal 142 from the injection molding machine 108 to the input conduit 156.

The portable molding gate control apparatus 100 further includes an output conduit 160 which is operably associated with the frame 116. The output conduit 160 is utilized for transmitting the switching signal 102 toward the switching device 104. The output conduit 160 may have any suitable form and may be in the form of a pin type connector. Preferably, the apparatus 100 further includes an output cable 162 for transmitting the switching signal 102 from the output conduit 162 to the switching device 104.

Preferably, as shown in FIG. 4, the container 116 is utilized to protect the power supply 130 and the timer 140 from damage during use, transportation and storage of the apparatus 100. Therefore, preferably, the power supply 130 and the timer 140 are secured to bottom 124 of the container 116 so that the power supply 130 and the timer 140 are positioned within the cavity 122 of the frame 116.

Further, preferably, the first electrical conduit 146, the second electrical conduit 148, and the third electrical conduit 150, are likewise positioned within the cavity 122 of the container 116. Preferably, as shown in FIG. 4, the input connector 156 and the output connector 160 are preferably connected to the container 116 and may for example be connected to bottom 124 of the container 116 and be located in apertures 164 in the bottom 124 of the container 116.

The power cord 132 is preferably fitted through aperture 166 in the container 116 and is utilized to connect the apparatus 100 to the power source 134. The bottom 124 and the top 126 of the container 116 may be made of an suitable, durable material, i.e. plastic, metal, or wood.

The machine operator 118 may grab portion 120 for gripping the apparatus 100 for portable carrying thereof. The portion 120 may have any suitable configuration and may be in the form of a handle. The handle 120 may be fixed or as shown in FIG. 4, be pivotally secured to the frame 116.

The switching signal 102 is utilized to selectively open and close the injection gate 106 within the mold 114 in the injection molding machine 108. The injection gate 106 may have any suitable form capable of selectively controlling the flow of plastic 170 through the plastic injection runner 172.

For example, as shown in FIG. 4, the injection molding machine includes a pellet hopper 174 for storing a supply of plastic pellets 176. The plastic pellets 176 are delivered from the hopper 174 into a chamber 178 within the machine. A screw 181 is utilized to convey the pellets into the chamber 178. Heat provided by electrical resistance heater bands 179 causes the plastic pellets 176 within the chamber 178 to melt or become fluid and form the plastic 170 which travels along runner 172 which interconnects the chamber 178 with mold cavity 180 which forms the workpiece 112.

The injection gate 160 may simply be a mechanical valve located in the runner 172 for selectively blocking and permitting the passing of the plastic 170 into the cavity 180. The runner may also be a heated distribution manifold disposed within the mold. Preferably, however, in that the force of the screw 181 creates an intense force within the runner 172, or resin distribution system 172, the use of a very powerful fluid actuated cylinder portion 182 may be necessary to selectively open and close the runner 172. The fluid cylinder portion 182 is preferably controlled by selectively permitting air from an air source 184 to move fluid plunger 186 selectively into blocking and permitting the passage of the plastic through the runner 172. Air from the air source 184 is utilized to open and close the fluid valve portion 182 to permit or prevent the plastic 170 to enter the cavity 180. It should be appreciated that air from the air source may alternatively be used to move the valve selectively into both the open and the closed positions.

Preferably, as shown in FIG. 4, the switch signal 102 from the output cable 162 is utilized to selectively energize a solenoid 192 within an air valve portion 194 of the switching device 104. The air valve portion 194 includes an air plunger 196 which is biased by air spring 198 into a open position which allows the air from the air source 184 to bias the plunger 186 within the fluid cylinder portion 182 to a closed position to prevent the plastic 170 from entering the cavity 180.

However, when the solenoid 192 is energized by the switching signal 102, the solenoid 192 causes the air plunger 196 to move in the direction of arrow 200 to move the air plunger 196 in such a manner to close the first open position, and open the second open position such that air from the air source 184 causes the fluid plunger 186 to move in the open direction shown by arrow 202 thereby permitting plastic 170 to fill the cavity 180.

At the initiation of a cycle, a controller 204 sends initiation signal 142 to both the screw 181 and the apparatus 100. The initiation signal 142 causes the screw 181 to move in the direction of arrow 206 causing the melted plastic 170 to move toward the injection gate 106. The apparatus 100 is utilized to delay the initiation signal 142 a specified period of time so that the switching signal 102 is delayed until a period later than the initiation signal 142 so that the injection gate 106 may remain closed for a period of time after the initiation of the cycle.

While the invention may be practiced with apparatus 100 controlling a solitary injection gate 106, preferably, the portable molding gate control apparatus of the present invention preferably is utilized to control a plurality of injection gates such that certain injection gates may be opened and closed before or after other injection gates.

Figure 1:
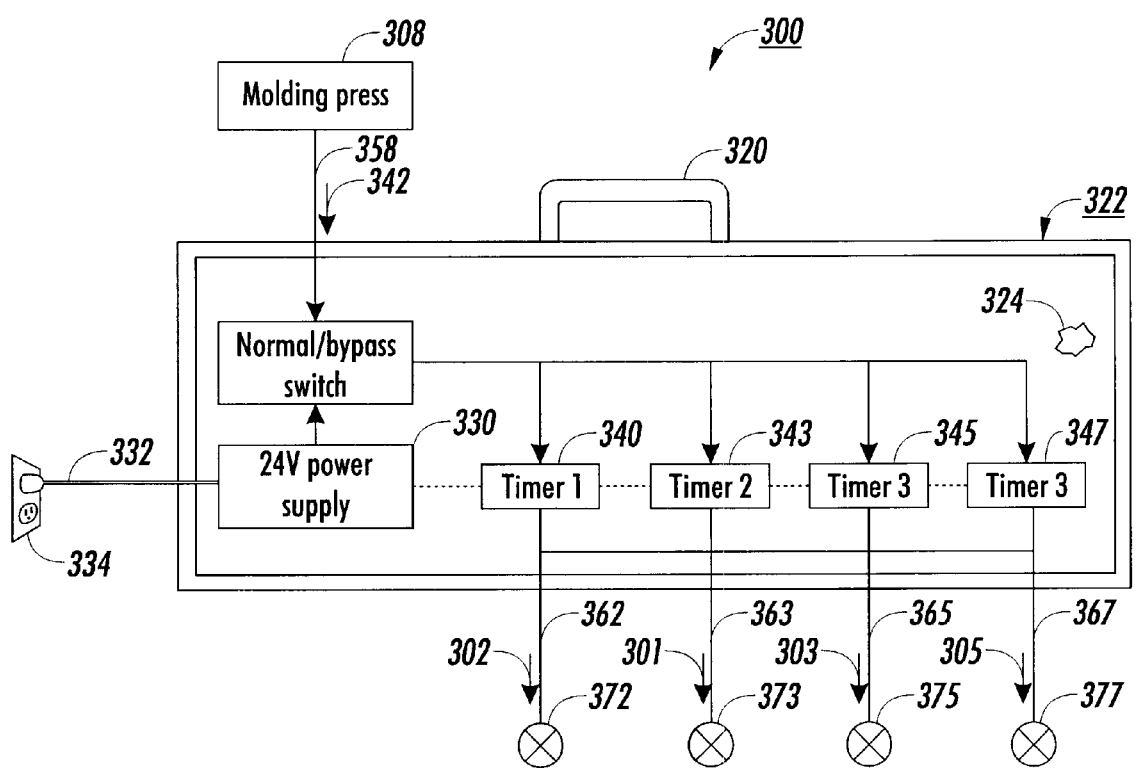
FIG. 1 is a schematic view of a first embodiment of a portable injection gate control for plastic molding.

For example, and referring now to FIG. 1, apparatus 300 is shown for controlling four distinct injection gates; namely, first injection gate 372, second injection gate 373, third injection gate 375, and fourth injection gate 377.

As shown in FIG. 1, the apparatus 300 includes a container 322 having a bottom 324. Similarly to container 122 of FIG. 4, the container 322 is light weight and hand carriable by handle 320. A power supply 330 similar to power supply 130 of the apparatus of FIG. 4, is mounted to the bottom 324 of the container 322. The apparatus 300 also includes a first timer 340, a second timer 343, a third timer 345, and a fourth timer 347. The timers 340, 343, 345 and 347 are similar to timer 140 of FIG. 4. The timers 340, 343, 345 and 347 are preferably secured to bottom 324 of the container 322.

The apparatus 300 further includes a power cord 332 which is connected to the power supply 330 as well as to a power source 334 for receiving an alternating current 110 volt power supply and transmitting the alternating current power to the power supply 330. The power supply 330 provides direct current power to the timers 340, 343, 345 and 347. The apparatus 300 is electrically connected to the molding press 308 by means of an input cable 358. An initiation signal 342 is sent through the input cable 358 from the molding press 308 to the apparatus 300. The initiation signal 342 is received at the timers 340, 343, 345 and 347. Preferably, each of the timers 340, 343, 345 and 347 is set at a different time delay such that the gates 372, 373, 375 and 377 each open at different times.

For example, the first timer 340 sends a first switching signal 302 through a first output cable 362 to the first gate 372. Similarly, the second timer 343 sends a second switching signal 301 through the second output cable 363 to the second gate 373. Similarly, the third timer 345 sends a third switching signal 303 through the third output cable 365 to the third gate 375. Similarly, the fourth timer 347 sends a fourth signal 305 through the fourth output cable 367 to the fourth gate 377 thereby opening the fourth gate 377.

Figure 2:
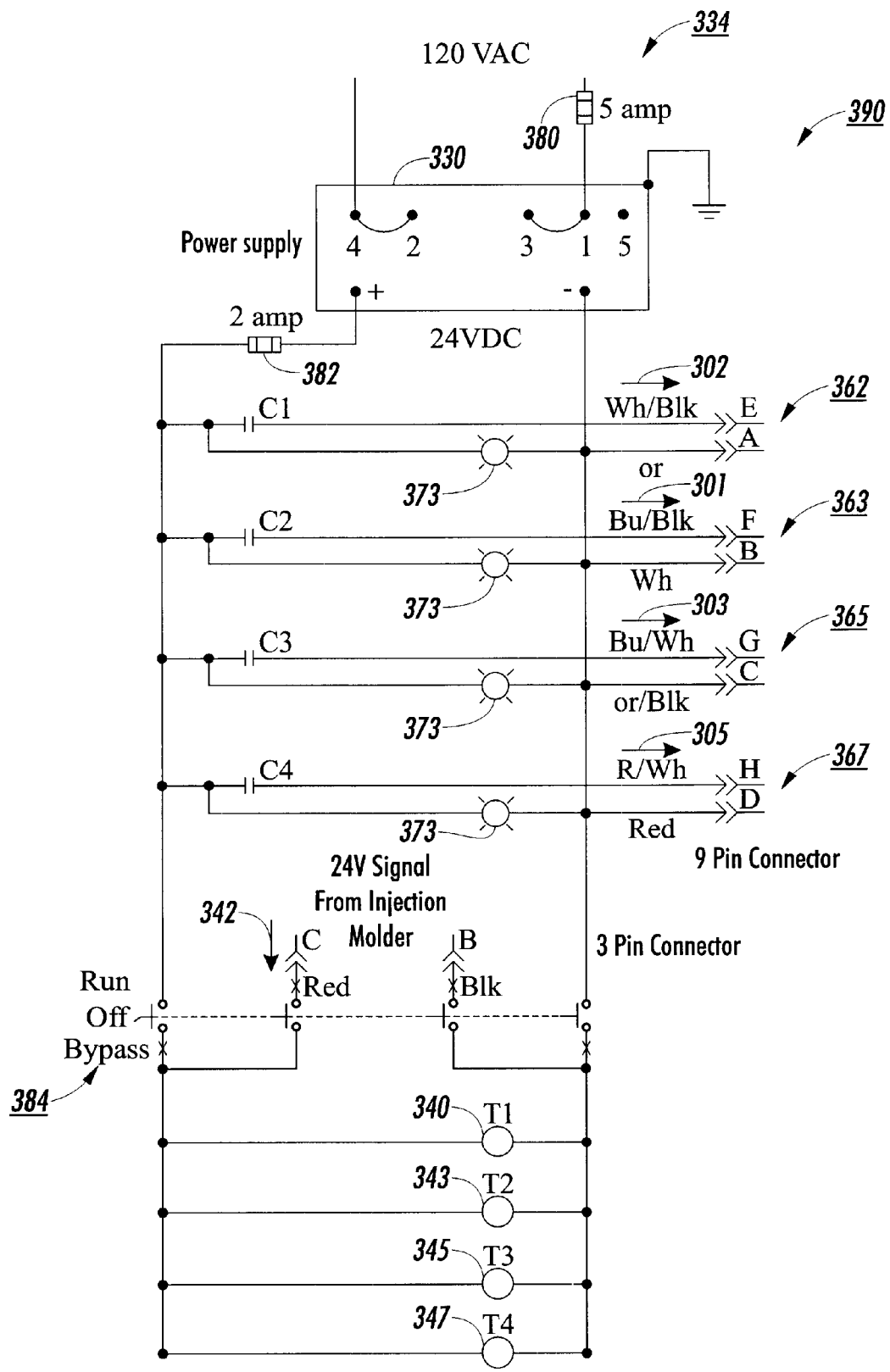
FIG. 2 is a schematic view of an electrical diagram for the portable injection gate control for plastic molding of FIG. 1.

Referring now to FIG. 2, an electrical diagram 390 is shown for the apparatus 300. The electrical diagram 390 includes the power supply 330 as connected to the timers 340, 343, 345 and 347 through a conduit 346 which includes an output fuse 382 having a rating of two amps. The timers 340, 343, 345, and 347 preferably each include a timing device in the form of a timing circuit, solenoid coil, and contacts such as C1, C2, C3 and C4, respectively. Indicator lights 373 are preferably illuminated when the contacts C1, C2, C3 and C4 are energized.

The electrical diagram 390 may include a switch 384 including, for example, run, off and bypass positions to provide for the normal operation of the apparatus at a run position, to provide for an off position in which a switching signal is sent to none of the gates and to provide for a bypass position in which the initiation signal is manually provided from the internal power supply 330 to initiate the timing sequence for the purpose of testing, or set-up.

The electrical diagram 390 also shows the output cables 362, 363, 365 and 367 which are utilized to send out the switching signals 302, 301, 303 and 305, respectively. The electrical diagram 390 may include an input fuse 380 positioned between the power supply 330 and the power source 334 to limit damage to the power supply 300.

Figure 3:
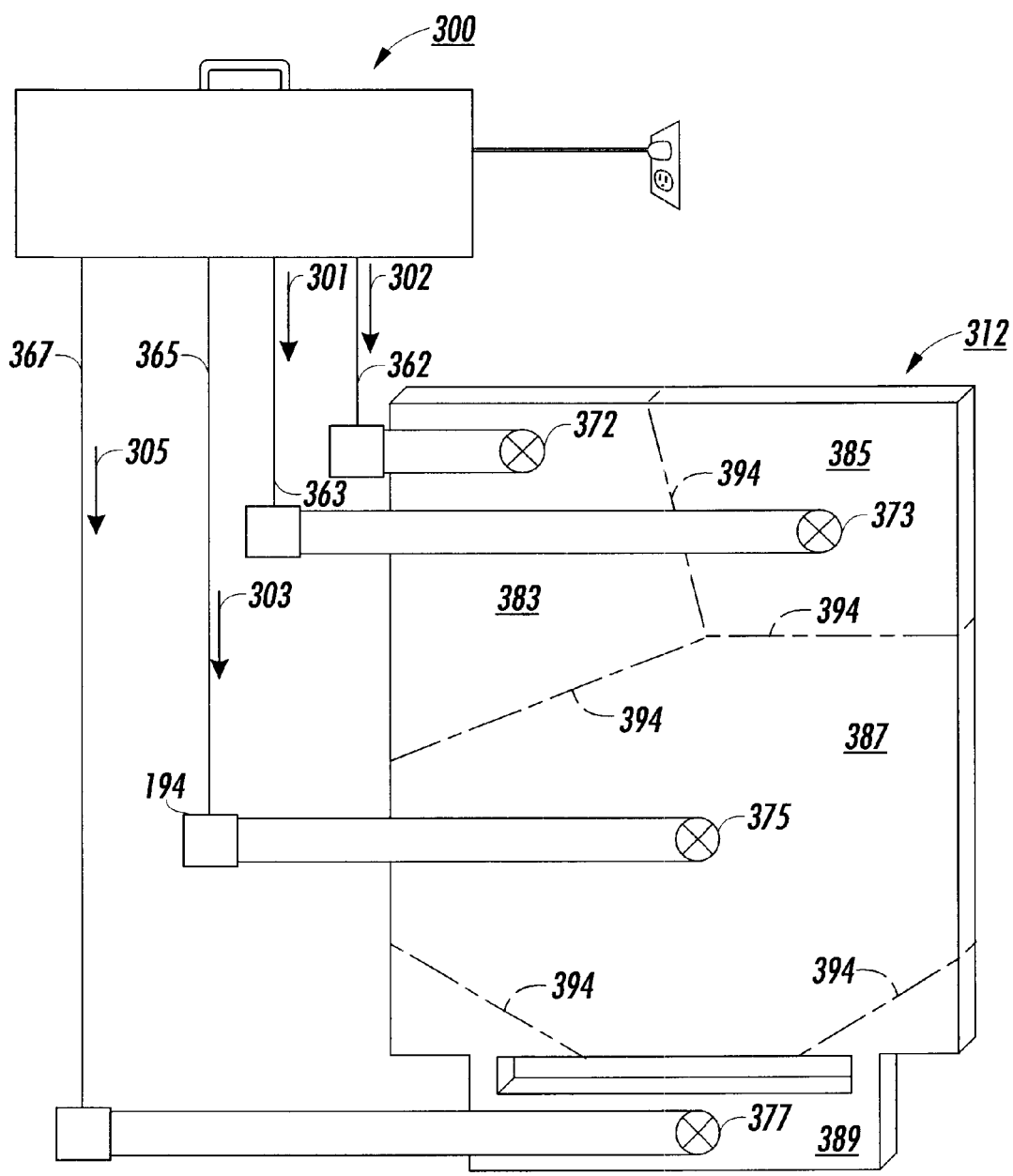
FIG. 3 is an perspective view of a plastic molded part which may be molded using the portable injection gate control for plastic molding of FIG. 1.

Referring now to FIG. 3, a workpiece 312 is shown for utilization with the apparatus 300 of the present invention. The workpiece 312 is shown divided into four zones, first zone 383, second zone 385, third zone 387 and fourth zone 389. A valve-gate is associated with each of the four zones. For example, a first gate 372 is positioned centrally in the first zone 383, a second gate 373 is positioned centrally in second zone 385, a third gate 375 is centrally positioned in third zone 387 and a fourth gate 377 is centrally positioned in fourth zone 389.

As shown in FIG. 3, each of the four zones, 383, 385, 387 and 389 has a different size or volume. Therefore, according to the present invention it is advantageous to have the material first enter and perhaps last stop flowing in the third zone 387. Conversely, the smaller zone, for example, the fourth zone 389, may have the material from the fourth gate 377 be last to enter the workpiece 312 and to be the first area to have the material stop flowing. By so controlling the beginning and end of the flow of material through the gates 372, 373, 375 and 377, the zones 383, 385, 387 and 389 may be accurately controlled such that the completion of cavity filling ends simultaneously in all areas of the mold cavity which will result in the reduction of injection pressure thereby reducing the need for higher clamp force and also will aid in the prevention of overpacking the molded article.

The apparatus 300 is, for example, utilized, as shown in FIG. 3, by first sending third switching signal 303 through third output cable 365 to the third gate 375 so that third zone 387, the largest zone, may first begin filling.

Since the first zone 383 is the next largest zone, preferably, the apparatus 300 then sends first signal 302 through first output cable 362 to the first gate 372 to permit the plastic to flow through gate 372 thus beginning the filling of the first zone 383.

Since the second zone 385 is the third largest zone, next, the apparatus 300 sends the second switching signal 301 to the second gate 373 along output cable 363 thereby opening the gate 373 permitting plastic to flow thereby permitting the second zone 385 to be filled.

Since the fourth zone 389 is the smallest zone, next, the apparatus 300 sends the fourth switching signal 305 along the fourth output cable 367 to the fourth gate 377 permitting plastic to run through the fourth gate 377 to begin the filling of the fourth zone 389.

Some period of time after the plastic begins to flow in the fourth gate 377, the workpiece 312 becomes completely formed and the molding cycle ends. It should be appreciated that the gates 372, 373, 375 and 377 are open only when the signals 302, 301, 303 and 305 are flowing toward the gates 372, 373, 375 and 377 to keep the gates 372, 373, 375 and 377 open. Thus, it can be readily understood that when any of the signals 301, 302, 303 and 305 stop, the respective gate closes ending the flow through that respective gate. Thus, not only may the beginning of the flow of plastic through gates 372, 373, 375 and 377 begin at different times, the flow of plastic through gates 372, 373, 375 and 377 may end at different times.

Preferably, modifications in the setting of the delay time within the timing devices T1–T4, may be varied in order to properly control the flow of plastic through the runners such that a workpiece with proper molding dynamics is accomplished. Occasionally, the configuration of a molded part being molded or an injection molding machine, may have a shape such that it may be desired to open the gate in a particular runner more than once during a molding cycle. The apparatus heretofore described may not be capable of such multiple opening and closing of the valve. The apparatus previously mentioned will send the signals 302, 301, 303 and 305 to the gates 372, 373, 375 and 377 as long as the contacts C1–C4 are energized. However, once the timers T1–T4 are no longer energized, the contacts are de-energized and the gates 372, 373, 375 and 377 remain closed until a new molding cycle is initiated, thereby prohibiting the flow of any additional plastic through the respective gates 372, 373, 375 and 377.

Figure 7:
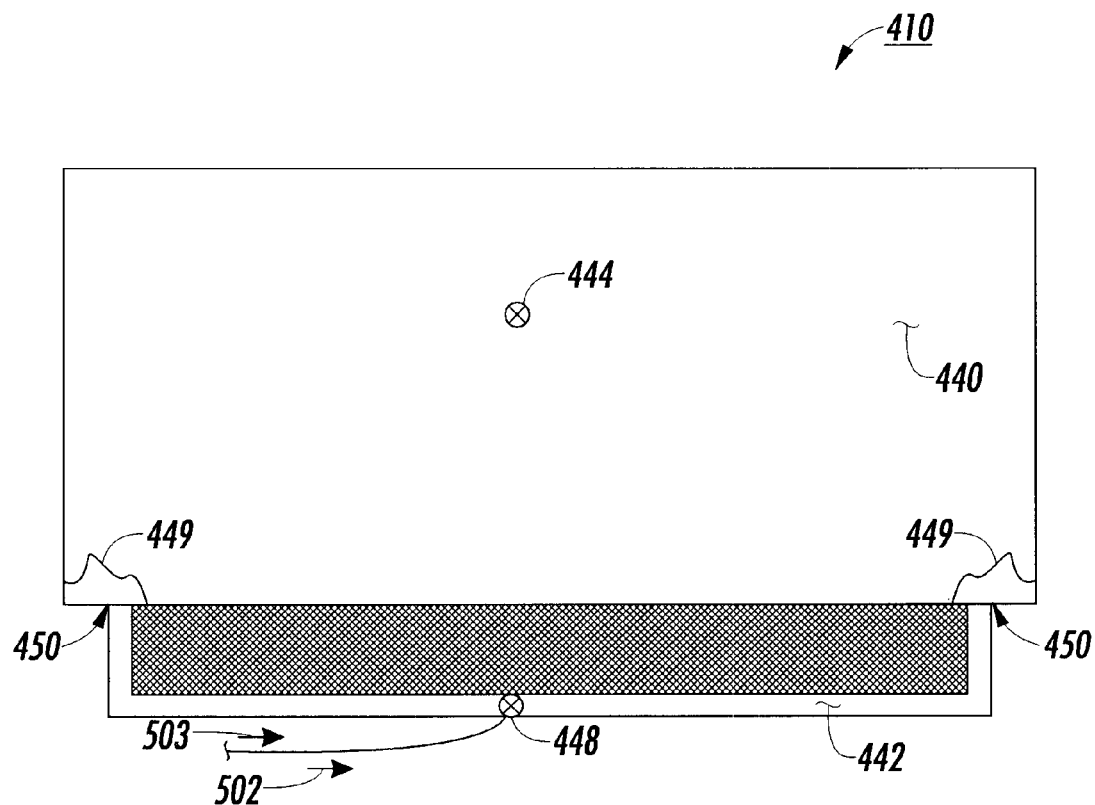
FIG. 7 is an plan view of a plastic molded part which may be molded using the multiple injection control device of FIG. 6.

When molding an article such as is shown in FIG. 7 depicted by 410, the filling of the very small volume within the zone 442 may occur quite quickly. Therefore, the very large area such as the zone 440 may require filling for a longer period of time than a small volume zone 442. It is therefore, advantageous to operate the respective gates 444 and 448 with time sequences that are grossly different with respect to each other.

Referring now to FIG. 7, a molded article 410 is comprised of a large area 440 and a small area 442. The area between 440 and 442 shown dark shaded is an opening. It is desirous to fill the small area 442 utilizing a gate control signal 502 that opens the gate 448 for a time of approximately 10% of the time utilized on gate 444 which is filling the large area 440 of article 410. Delay of gate 448 until near the end of open time of gate 444 results in a cold interface where the advancing polymer admitted to the cavity 442 joins the already cooling polymer admitted by gate 444 as depicted at 449. This results in a cold weld that is both mechanically and cosmetically unacceptable. If gate 448 were opened at the same time that gate 444 is opened, it would allow the two polymer fronts to join while still molten at area 449, thereby avoiding the problem described previously. The gate would have to be closed well before the end of the injection cycle to prevent seriously overpacking the small area 442. By closing the gate 448 early, hold or pack pressure is not available to counteract the polymer's characteristics to shrink voluminously. Overpacking and uncontrolled shrink will render the molded article useless. The desired state is to be able to open gate 448 initially when gate 444 opens at the initiation of the molding cycle. Then, while gate 444 continues to admit polymer to the cavity, gate 448 is closed. Then, during the final stages of the injection cycle, and while gate 444 is still in the open state, gate 448 is re-opened with signal 503 to allow pack or hold pressure to be able to act upon the molten core within the polymer thickness in area 442 for the purpose of sink prevention. In order to accomplish this apparatus must be available to open and close the same gate more than once within a singularly initiated molding cycle.

Figure 8:
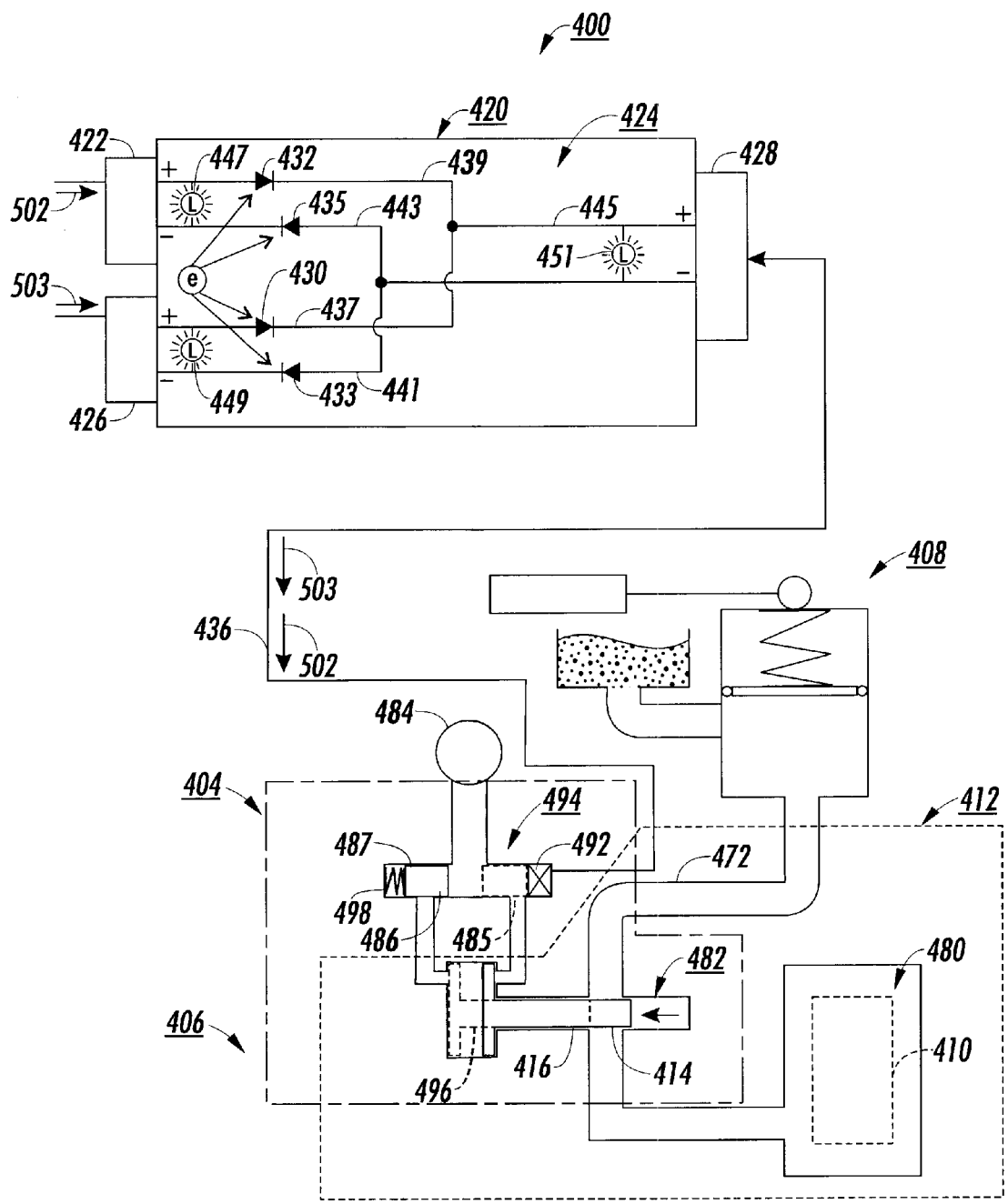
FIG. 8 is an electrical diagram for the multiple injection control device for a single injection molding valve gate of FIG. 6.

According to the present invention and referring now to FIG. 8, apparatus 400 is shown for permitting injection gate 406 to be opened more than once during a molding cycle. The apparatus 400 is utilized for sending a plurality of switching signals, for example, first switching signal 502 as well as second switching signal 503 to switching device 404 for sequentially switching the position of the injection gate 406 of an injection molding machine 408 for molding a workpiece 410 in a mold 412 during a molding cycle.

Either of switching signals 502 and 503 permits the injection gate 406 to move from a first closed position 414 to a first opened position 416. The apparatus 400 further permits the gate 406 to return to the closed position 414 and then to return to the open position 416. The apparatus 400 further permits the gate 406 to move from the opened position 416 to return to the closed position 414. The switching signals 502 and 503 may be indicative of either the open position 416 or the closed position 414.

Preferably, and as shown in FIG. 8, the switching signals 502 and 503 are indicative of the open position 416. The apparatus 400 is selected so as to be hand-carryable by a machine operator. The apparatus 400 includes a body 420. Preferably, as shown in FIG. 8, the body 420 is in the form of a container. The container 420 defines a cavity 424 located therein. The body 420 is preferably light weight and is hand-carryable by a machine operator.

The apparatus 400 further includes a first input conduit 422. The first input conduit 422 is operably associated with the body 420 and is utilized for receiving the first switch signal 502 indicative of a desire to switch the position of the injection gate 406.

The apparatus 400 further includes a second input conduit 426. The second input conduit 426 is operably associated with the body 420. The second input conduit 426 is adapted for receiving the second switching signal 503 indicative of a desire to switch the position of the injection gate 406.

The apparatus 400 further includes an output conduit 428 simultaneously operably connected to the first input conduit 422 and the second input conduit 426. The output conduit 428 is utilized for transmitting one of the first switching signal 502 and the second switching signal 503 to the switching device 404.

The first input conduit 422, the second input conduit 426 and the output conduit 428 may have any suitable shape capable of transmitting signals. For example, as shown in FIG. 8, the conduits 422, 426 and 428 are in the form of pin-type connectors.

The apparatus 400 further includes a first inhibitor 430. The first inhibitor 430 is operably associated with the second input conduit 426. The first inhibitor 430 is utilized for inhibiting the first switching signal 502 from being transmitted through the second input conduit 426.

The apparatus 400 further includes a second inhibitor 432 which is operably associated with the first input conduit 422. The second inhibitor 432 is utilized for inhibiting the second switching signal 503 from being transmitted through the first output conduit 422.

Preferably, and as shown in FIG. 8, the first inhibitor 430 and the second inhibitor 432 are fitted into the cavity 424 of the body 420 of the apparatus 400. The body 420 serves to protect the inhibitors 430 and 432 from damaging contamination during use, storage and transpiration of the apparatus 400.

The inhibitors 430 and 432 may be any suitable device capable of inhibiting the switching signal from being transmitted in the improper direction. For example, as shown in FIG. 8, the inhibitors 430 and 432 may be in the form of semi-conductor diodes, for example, silicone diodes. The silicone diodes 430 and 432 may have any suitable rating capable of operation in the apparatus 400. For example, the silicone diodes 430 and 432 may have a rating from 1 to 2 amps and have a rating of peak reverse voltage (PRV) of 100–200 volts.

Figure 6:
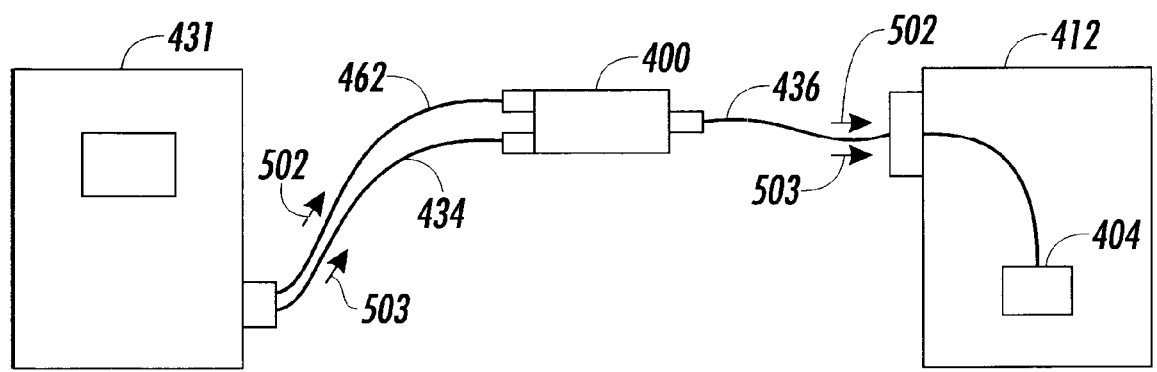
FIG. 6 is a schematic view of a schematic diagram for multiple injection control device for a single injection molding valve gate according to the present invention.

Referring now to FIG. 6, according to the present invention, the apparatus 400 is shown utilized within different components of the molding machine. As shown is FIG. 6, the apparatus 400 is electrically positioned between controller 431 of the injection molding machine and mold 412 of the molding machine. As shown in FIG. 6, the controller 431 is adapted to send a first switching signal 502 along first input cable 462 toward the apparatus 400 and to send a second switching signal 503 along second input cable 434 toward the apparatus 400. It should be appreciated that without the use of the apparatus 400 if the first cable 462 and the second cable 434 were directly interconnected to the switching device 404, the first switching signal 502 would be turned along the second input cable 434 to the controller and likewise the second switching signal 503 would pass along first input cable 462 toward the controller. The returning signals 502 and 503 returning to the controller 431 would damage the controller as well as short the circuit and thereby fail to operate the switching device 404.

However, as shown in FIG. 6, through the utilization of the apparatus 400, the apparatus 400 permits an output cable 436 to be directly connected to the switching device 404. The output cable 436 is utilized to send both the first switching signal 502 and the second switching signal 503 along the same output cable 436. Preferably for proper use of the apparatus 400 only one of the first switching signal 502 or the second switching signal 503 is permitted to pass along the output cable 436 at any one time. Thus, the first switching signal 502 may cause the switching device 404 to open at a first duration of time and the second switching signal 503 may cause the switching device 404 to open the gate at a later period of time, thus permitting the gate to open two distinct times during the molding cycle.

Referring now to FIG. 7, the work piece 410 is shown in greater detail. The work piece 410 as shown in FIG. 7 includes a first zone or major area 440 as well as a second zone or minor area 442. Since there are two areas or zones in the work piece 410, common molding practice is for the work piece 410 to have a gate for each of the two areas or zones. For example, as shown in FIG. 7, the work piece 410 includes a first gate 444 for providing plastic for the major area 440 and a second gate 448 for providing plastic to the minor area 442.

Utilizing conventional molding practice, due to the large major area 440 compared to the very small minor area 442, the gate 444 would be active or have plastic flow through during the entire injecting phase of the molding cycle. Typically, the gate 448 would be open during a small portion of the injection cycle to add only enough plastic to cause the transition zone or weld line to occur at the transition zone 449 which would be away from the weak area 450 where a thin cross-section at a weld line may be a structural problem or cause appearance problems. This would have to be done during the early stage of the injection cycle before the leading edges of the advancing polymer become cooled to prevent a cold weld at 449.

Utilizing old technology, the only two modes of gate control possible with the gates as supplied on the molding press are either (a) open the valve gate 448 with no delay then close it early thereby avoiding overpack of the minor area or (b) delay the opening of the gate 448 until near the end of the injection then open for a short time until the end of the injection. Neither of these alternatives will produce acceptable results. Due to the gate being closed during the later portion of the injecting phase, it is not possible to apply hold pressure to the minor area and therefore unacceptable sink of the plastic occurs. Alternatively, if enough polymer is injected to place the transition zone 449 in the position as shown and to avoid sink, the minor area 442 will become overpacked and stuck. The solution to this problem is to be able to turn the gate 448 on initially to admit plastic, then turn the gate off in order to not overpack, then turn the gate back on to transmit holding pressure to the minor area for the purpose of sink control finally turning the gate off. Control systems presently available with. molding machines do not allow the signal to be turned back on or the gate to be reopened once it is closed.

Figure 5:
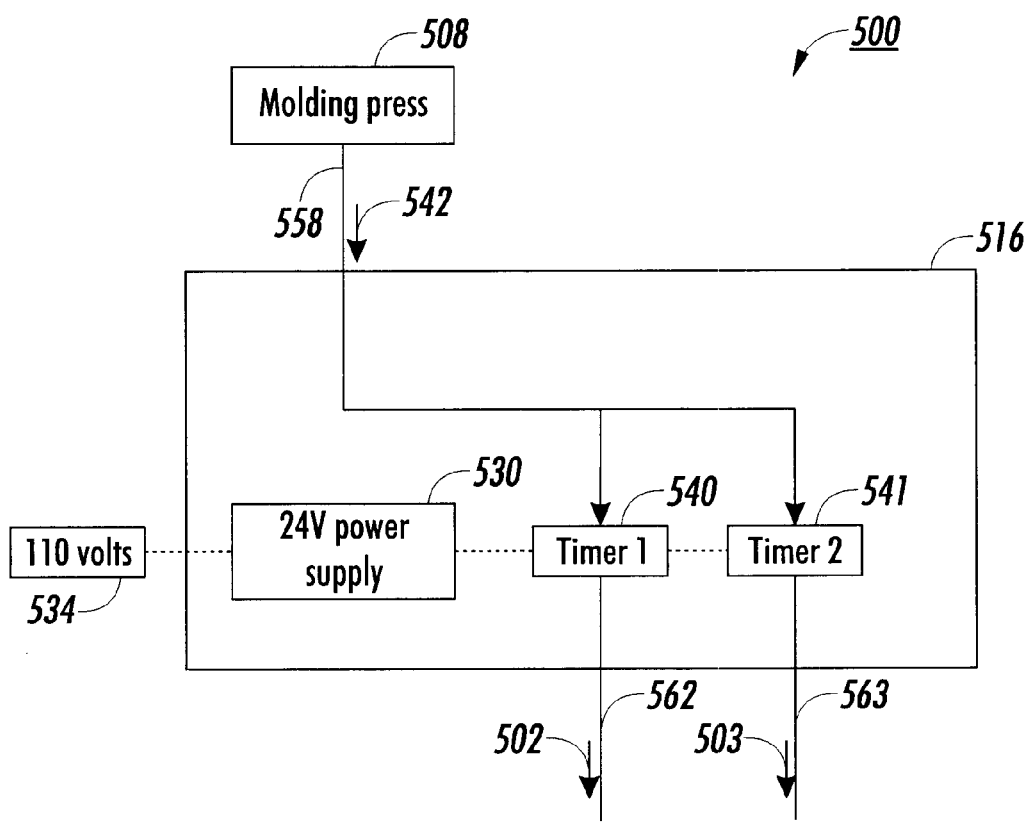
FIG. 5 is a schematic view of a third embodiment of a portable injection gate control for plastic molding.

Referring now to FIG. 5, apparatus 500 is shown for providing a plurality of switching signals to be utilized in conjunction with the apparatus 400. The apparatus 500 is similar to apparatus' 100 and 300 of FIG. 4 and FIG. 1, respectively. The apparatus 500 includes a container 516 similar to the container 116 of the apparatus 100 of FIG. 4. The container 516 may be made of any suitable durable material and may be in the form of, for example, a container having a bottom (not shown) and a top (not shown). The container 516 may, in fact, be similar to container 116 of FIG. 4.

The apparatus 500 further includes a power supply 530 located within the container 516. The power supply 530 is utilized to receive a 110 volt AC power source 534 and converted into, for example, a 24 volt DC power supply. The apparatus 500 further includes a first timer 540 and a second timer 541. The timers 540 and 541 are similar to timers 140 of FIG. 4.

The apparatus 500 receives an initiation signal 542 from the molding machine 508 through input cable 558. The initiation signal 542 is received at the first timer 540 and the second timer 541. The first timer 540 sends out a first switching signal 502 along a first cable 562. The second timer 541 sends a second switching signal 503 along second cable 563. It should be appreciated that the first timer 540 and the second timer 541 are set so that when the initiation signal 542 reaches the first timer 540 and the second timer 541, the first timer 540 is adapted to send out the first switching signal 502 during a first period of time and the second timer 541 is adapted to send out the second switching signal 503 at a time later than the first switching signal 502.

Thus, the first timer 540 and the second timer 541 are adapted for sequentially switching the position of the injection gate 406 (see FIG. 8) during a molding cycle from a first closed position to a first open position to a second closed position, to a second open position and finally to a third closed position. Thereby, the first switching signal 502 and the second switching signal 503 may be utilized to open the gate 406 for two separate distinct times during the molding cycle.

Referring again to FIG. 8, the gate 406 may be any suitable gate, but preferably is similar to gate 106 of FIG. 4. For example, the gate 406 is preferably located within the mold 412 which is utilized to mold the work piece 410 within cavity 480. While the gate 406 may be directly actuated by the first signal 502 and the second signal 503, preferably, similarly as to the gate 106, the gate 406 includes a air valve portion 494 and a fluid cylinder portion 482.

The air valve portion 494 utilizes signals 502 and 503 to selectively position a plunger 486 from a first position 485 to a second position 487. The plunger 486 may be biased as shown in the closed position by an air spring 498 and provides pressure to plastic plunger 496 to cause it to be in the closed position. A solenoid 492 is utilized to actuate the plunger 486 into the second or open position 487. When the plunger 486 is in the open position 487, air from the air source 484 is utilized to bias plastic plunger 496 into open position 416. When the plunger 486 is in the closed position 485, air from the air source 484 is utilized to bias plastic plunger 496 into the first closed position 414. When the plastic plunger 496 is in the second open position 416, plastic may progress through the runner or gate 472 and enter the cavity 480 to form the work piece 410.

Output cable 436 from the apparatus 400 is preferably connected to the solenoid 492. When the first signal 502 arrives at the solenoid 492, the solenoid 492 moves from first position 485 to second position 487 thereby permitting air to move the plastic plunger 496 into the open position 416 permitting the work piece 410 to be formed. After the first signal 502 is no longer being sent along output cable 436, the solenoid 492 switches the air pressure to the "closed" portion of valve cylinder 482, which causes plastic plunger 496 to return to the first closed position 414 stopping the further flow of material along the runner 472.

Later, as the second switching signal 503 travels down the output cable 436, the solenoid 492 is again re-energized causing the air plunger 486 to move from the first closed position 485 to the second open position 487 thereby actuating the plastic plunger 496 permitting the plastic to again return down runner 472 toward the work piece 410. Later, as the second switching signal 503 is no longer sent down output cable 436, the air spring 498 switches the air pressure to the "closed" portion of valve cylinder 482, which causes plastic plunger 496 to return to the first closed position 414 stopping the further flow of material along the runner 472. Thereby, the apparatus 400 may be utilized to send two separate distinct switching signals along the same output cable 436 to a common solenoid 492 to cause the gate 406 to open and close at two separate spaced apart times in the molding cycle.

Referring again to FIG. 8, while it should be appreciated that the present invention is embodied in apparatus 400 may operate utilizing only two diodes, for example, first diode 430 and second diode 432, preferably for a more robust system, the apparatus 400 further includes a third diode 433 and a fourth diode 435.

As shown in FIG. 8, apparatus 400 preferably includes the first diode 430 and the second 432 preferably positioned along positive legs 437 and 439, respectively. The third diode 433 and fourth diode 435 are positioned along negative legs 441 and 443, respectively. The third diode 433 and the fourth diode 435 help to assure that current flow and switching signals 502 and 503 are directed properly along positive output leg 445 of the apparatus 400.

As shown in FIG. 8, the apparatus 400 may further include a first indicator lamp 447 located between legs 439 and 443 to indicate when the first switching signal 502 is being transmitted throughout apparatus 400. The apparatus 400 may further include a second indicator lamp 449 position between legs 437 and 441 for indicating when the second switching signal 503 is being transmitted through the apparatus 400.

Further, the apparatus 400 may include a third indicator lamp 451 connected to the leg 445 to indicate the time when either the first switching signal 502 or the second switching signal 503 is being transmitted through the apparatus 400.

The lamps 447, 449 and 451 are thus utilized to assure that the proper timing of the gate sequencing is set within the apparatus 400 prior to the molding of a part within the mold cavity 480.

By providing a portable, variable time control for sequencing multiple injection gates in an injection mold, plastic components with improved strength and appearance may be molded on equipment without such multiple injection gates sequencing controls.

By providing a simple, reliable and inexpensive gate sequencing controller which may be portable and be added to an existing molding machine without such gate sequencing controls, an inexpensive existing obsolete molding machine may be upgraded to mold complex shapes with improved quality by permitting gate sequencing heretofore incapable of being performed on that machine.

By providing a portable gate sequencing apparatus for an injection molding machine utilizing simple commercially available time delay relays, a simple, reliable and inexpensive portable gate sequencing control apparatus may be provided.

By providing a gate sequencing device for the gates of an injection molding machine, plastic material may be added to a mold in a control fashion such that melt flow advancement can be optimally controlled and clamp tonnage requirements may be reduced by means of balancing and sequencing the fill pattern within the mold.

By providing a gate sequencing control for a multiple injection gate injection mold, the utilization of the gate sequencing and opening can result in the control of flash and weld line location.

By providing an apparatus for enabling multiple injection of a single injection molding gate valve which is portable and may be added to an existing machine, plastic molded part quality may be improved and complex large components may be more readily molded.

By providing a device including semi-conductor diodes to permit two different time signals from the injection molding press control to operate a single injection valve gate off, on, off, on, off action or the sequential opening and closing of a gate valve for more than one cycle during the molding cycle can be accomplished.

By providing a device for enabling multiple injection of a single injection molding gate valve utilizing diodes to isolate the direction or current flow, two timing sources may be combined into a single circuit for complex timing sequencing without any adverse affects to the controlled equipment.

By providing a device for permitting multiple openings of an injection valve gate during a molding cycle, large areas and small areas within a mold may be successfully molded without having unacceptable cold welds occur at the weld line location and without having appearance problems due to sinks on the workpiece.

It is, therefore, apparent that there has been provided in accordance with the present invention, multiple injection control device for molding plastic parts that fully satisfies the aims and advantages hereinbefore set forth. While this invention has been described in conjunction with specific embodiments, it is evident that many alternatives, modifications, and variations will be apparent to those skilled in the art. Accordingly, it is intended to embrace all such alternatives, modifications and variations that fall within the spirit and broad scope of the appended claims.

I claim:

1. A method for sending a series of switching signals to a switching device for molding a work piece in a mold comprising:

provide a control unit for sending a series of switching signals to a switching device for sequentially switching the position of an injection gate;

receiving at a first input conduit of the control unit a first switching signal indicative of a desire to switch the position of the injection gate from the first closed position to the first open position;

inhibiting the transmission of the first switching signal to a second input conduit of the control unit;

transmitting the first switching signal through the control unit to the injection gate;

switching the position of the injection gate from the first closed position to the first open position;

detecting the absence of the first switching signal, the absence being indicative of a desire to switch the position of the injection gate from the first open position to the second closed position;

transmitting the absence of first switching signal through the control unit to the injection gate;

switching the position of the injection gate from first open position to the second closed position;

receiving at the second input conduit of the control unit a second switching signal indicative of a desire to switch the position of the injection gate from the second closed position to the second open position;

inhibiting the transmission of the second switching signal to the first input conduit of the control unit;

transmitting the second switching signal through the control unit to the injection gate;

switching the position of the injection gate from the second closed position to the second open position;

detecting the absence of the second switching signal, the absence being indicative of a desire to switch the position of the injection gate from the second open position to the third closed position;

transmitting the absence of the second switching signal through the control unit to the injection gate; and switching the position of the injection gate from second open position to the third closed position.

2. The method according to claim 1, further comprising providing a container defining a cavity therein for at least the control unit.

3. The method according to claim 1:

wherein at least one of the receiving a first switching signal and receiving a second switching signal comprises receiving a direct current electrical signal; and wherein at least one of the inhibiting the first signal switching and inhibiting the second switching signal comprises inhibiting with a diode.

4. The method according to claim 1, wherein at least one of the receiving a first switching signal and receiving a second switching signal comprises receiving a direct current electrical signal.

5. The method according to claim 1, wherein at least one of the receiving a first switching signal and receiving a second switching signal comprises connecting the input conduit to a switching signal producing device.

6. The method according to claims 1, further comprising operably connecting a device to the first input conduit and the second input conduit for generating the switching signals, the device including a power supply for generating the switching signals, a first timer operably connected to the power supply and to the first input conduit for delaying the transmission of the first switching signal to said first input conduit and a second timer operably connected to the power supply and to the second input conduit for delaying the transmission of the second switching signals to said second input conduit.

7. The method according to claim 1, wherein at least one of the switching the position of the injection gate from first open position to the second closed position and the switching the position of the injection gate from second open position to the third closed position comprises utilizing a fluid to switch the position of the gate.

8. The method of claim 1 wherein the control unit is at least one of portable and hard carriable.

* * * * *